Aug. 22, 1933.  T. C. RUSH  1,924,002
PULLER
Filed June 15, 1932
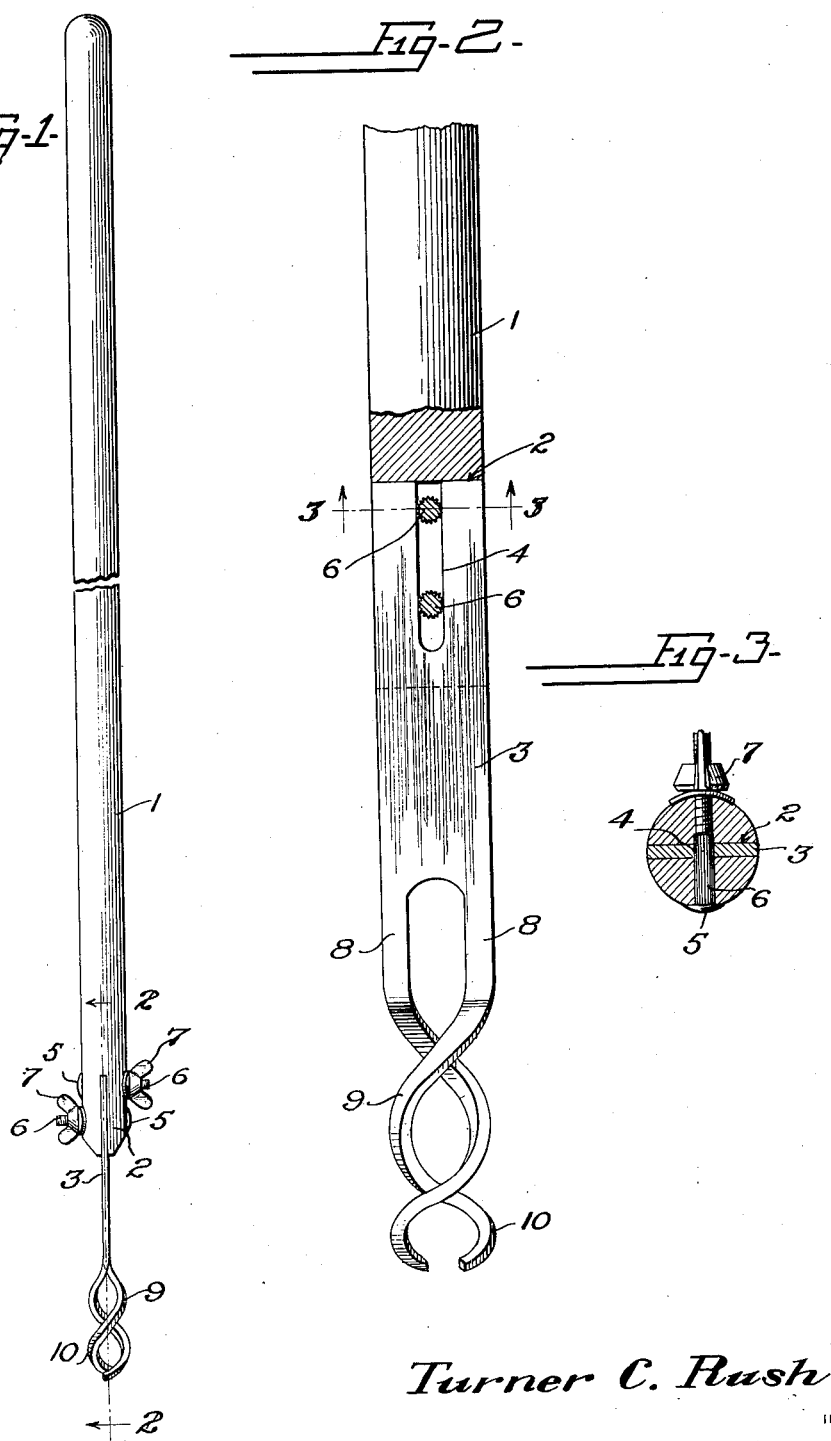
Turner C. Rush
INVENTOR
BY Victor J. Evans & Co.
ATTORNEY Patented Aug. 22, 1933

1,924,002

UNITED STATES PATENT OFFICE 1,924,002

PULLER

Turner C. Rush, Lexington, Ky.

Application June 15, 1932. Serial No. 617,438

2 Claims. (Cl. 55—65)

The object of this invention is the provision of a weed puller that is characterized by simplicity in construction and reliability and efficiency in practical use.

To the attainment of the foregoing the invention consists in the improvement hereinafter described and definitely claimed.

In the drawing:

Figure 1 is an edge view of the improvement.

Figure 2 is a side elevation thereof with a portion of the handle and the securing bolts being in section.

Figure 3 is a transverse sectional view approximately on the line 3—3 of Figure 2.

As disclosed by the drawing I employ a handle 1 which is preferably of wood and which is of any desired length. The handle from one of its ends is provided with a central slot or opening 2, and this opening is designed to receive therein the flat body portion 3 of the substantially rectangular hard metal plate of the improvement. The body 3, from one of its ends, is centrally slotted longitudinally, as at 4, and through these slots there are passed oppositely directed headed bolts 5 that also pass through the slotted end of the handle 1. The shank 6 of each of the bolts, for the major portion of the length thereof, is ribbed longitudinally, as at 6, and the teeth provided by these ribs are designed for gripping engagement with the side walls provided by the slot 4 of the plate 3. On the ends of the bolts there are suitable washers which contact with the opposite faces of the handle and screwed on these bolts there are winged nuts 7. The body plate 3 is thus effectively held in the slotted end of the handle. The body plate 3 from what I will term its outer end is centrally cutaway or bifurcated to provide the edges thereof with parallel arm extensions 8—8. The arms are twisted upon each other in opposite directions to provide rounded spaced portions 9 and the inner or lapping ends of the said rounded portions are further twisted in opposite directions to afford inwardly rounded gripping elements 10 whose sides and ends are spaced from each other. The arms 8, it will be noted, are in the nature of twisted tines and gradually increase in thickness from their outer ends to their straight and parallel portions 8—8.

Also it is to be noted that the respective pairs of tines are of auger formation, but the respective tines are at all times spaced and never in contact with each other.

In operation the pointed ends of the tines are inserted over a weed and the device is twisted so that in burrowing into the ground the earth engaged thereby as well as the roots of the weed will be elevated above the ground surface.

It is believed that when the foregoing has been read in connection with the accompanying drawing that the simplicity and advantages of my improvement will be readily apparent by those skilled in the art to which the invention relates so that further detailed description will not be required.

Having described the invention, I claim:

1. A weed exterminator comprising a plate which is fixed on a handle and which plate has its outer end centrally bifurcated to provide twin tines which are parallel with each other for a distance from their juncture with the body plate and from thence are spirally twisted in opposite directions, the said twisted portions being spaced from each other and the outer twisted portions having their ends likewise spaced from each other, the second end of the body plate being provided with a slot and the handle having a slot to receive the end of such plate therein and oppositely directed headed bolts having their shanks ribbed for a portion of their length, passing through the handle and slot and whereby the ribbed portions of the bolts will contact with the walls afforded by the slot in the plate and wing nuts engaging said bolts.

2. A weed exterminator comprising a plate having an inner slotted end, a handle therefor, the opposite end of said plate being bifurcated to provide twin tines disposed parallel with each other for a distance from their juncture with the body plate and from thence spirally twisted in opposite directions, the said twisted portions being spaced from each other and the outer twisted portions having their ends likewise spaced from each other, and means passing through the handle and the inner slotted end of the plate for adjustably and detachably connecting the plate with said handle.

TURNER C. RUSH.